UNITED STATES PATENT OFFICE.

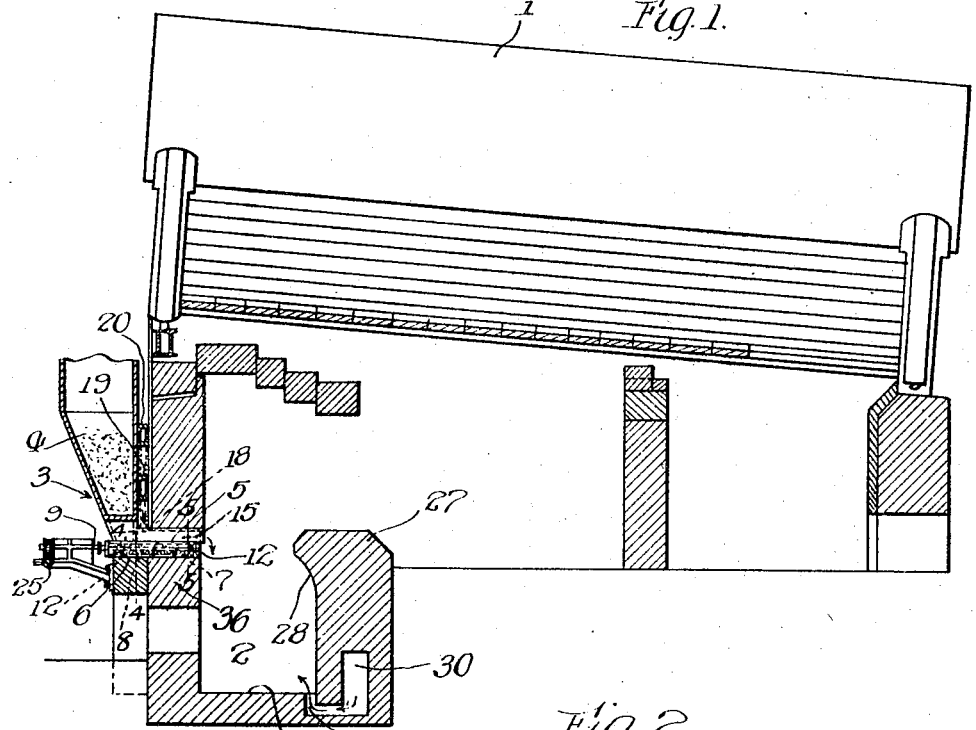

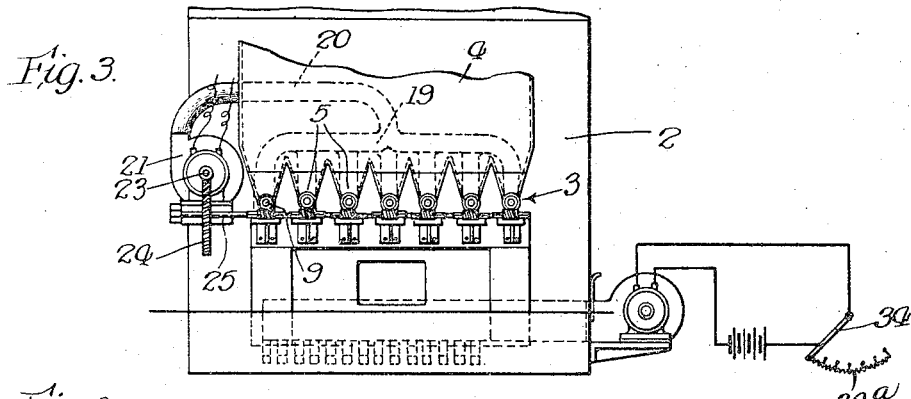
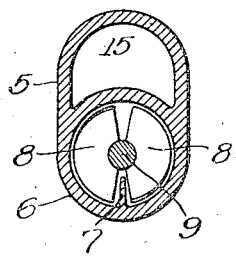
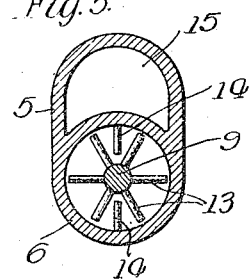
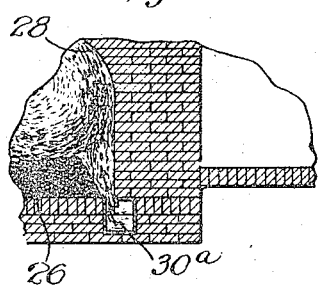
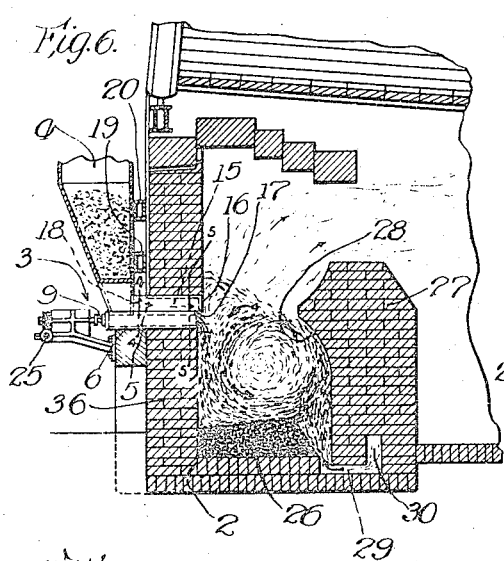
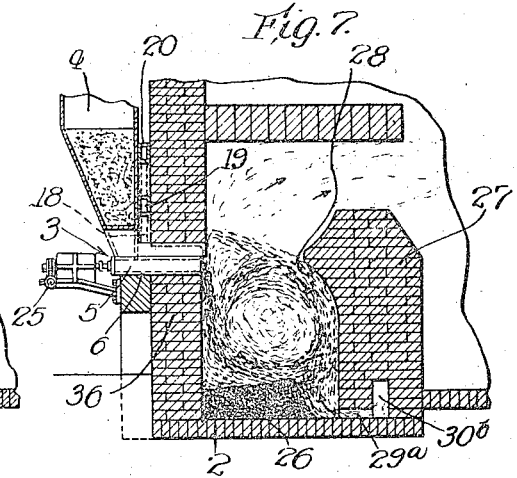

THOMAS J. STEPHENS, OF NEW CASTLE, PENNSYLVANIA, ASSIGNOR TO STEPHENS ENGINEERING COMPANY, OF NEW CASTLE, PENNSYLVANIA, A CORPORATION OF DELAWARE.

PROCESS OF OXIDIZING FUEL.

1,369,200.　　　　　　　　Specification of Letters Patent.　　Patented Feb. 22, 1921.

Application filed December 26, 1918. Serial No. 268,321.

*To all whom it may concern:*

Be it known that I, THOMAS J. STEPHENS, a citizen of the United States, and a resident of New Castle, in the county of Lawrence and State of Pennsylvania, have invented a certain new and useful Process of Oxidizing Fuel, of which the following is a specification.

This invention relates to a process of oxidizing fuel wherein, for the purpose of insuring complete ignition and consumption of the fuel at a time and under conditions that will leave ample opportunity for the resultant hot gases to transmit their heat to the heat-absorbing surfaces of the furnace, fuel, such, for instance, as coal in sub-divided form and commingled with a combustion supporting medium (for convenience hereinafter designated "air"), is progressively fed through the furnace wall and blasted downwardly into a combustion zone maintained above the ignition temperature, and subjected to vortical action set up within the combustion space in such manner that the lighter particles of fuel are kept in suspension and burned in the current of air which serves as a vehicle for it, while the heavier particles are drawn downward upon a bed built up of such heavier particles and there drifted about, distilled of their volatile constituents, and disintegrated so that they too gradually enter into suspension and circulation in the combustion vortex, the process being regulated by the proportion of air and the force with which it is introduced, and these conditions being determined according to the degree of reduction of the fuel introduced. The ash or ultimate non-combustible constituent of the fuel is automatically elevated by the vortex, and is borne off from the combustion chamber upon the outgoing products of combustion, either to the stack or to a settling chamber, whence it radiates its heat, and the preferred detail of procedure embodies the introduction of the fuel through two opposed walls of the furnace and the development of two impinging vortexes in order to insure sufficient action, particularly in the matter of disintegrating the precipitated coarser particles of fuel.

The object of the invention is to provide a process of combustion which is highly efficient, particularly in the matter of insuring prompt consumption of the heavier portions of the fuel; also to render the vortex action within the combustion chamber more effective with regard to the coarser portions of the fuel to the end that coarser fuel may be used, and to insure a single vortical action coextensive with the horizontal dimension of the whole combustion zone, and thereby limit to a single wall, as distinguished from two opposed walls, the introduction of commingled fuel and air.

Accordingly, one feature of the present invention consists in providing opposite the wall of the combustion chamber, through which the commingled fuel and air is introduced, a coöperating wall, for instance, the bridge wall of the furnace, so formed as to assist in developing the vortical action, such wall being provided with an inwardly curved upper portion which directs the current of circulating medium back toward the place of admission. Another feature consists in providing at the base of the bed of coarser fuel in the combustion chamber, an auxiliary inlet for air, so related to the bed that it will not only supply the precipitated coarser particles of fuel with air, but will greatly increase the agitation, drifting, erosion and consequent disintegration of said coarser particles, and will cause them to sooner enter into the vortex and to be driven upward against the deflecting wall and thence across the combustion chamber to the intake wall where they impinge against the latter and fall into the incoming stream of fuel and air; the total supply of air in the present instance, like the supply of air in the previous application, being regulated to supply the necessary oxygen to the combustion process and to determine the rate of flow of products of combustion through the furnace; and the delivery of both the main and auxiliary air supplies in the present instance, like the single air supply in the former application, being preferably subdivided into numerous jets and directed in such manner as to make effective vortical action without excessive quantity of air being admitted.

Further features of the present invention relate to details of means for imparting the auxiliary supply of air to the bottom of the combustion chamber.

The present invention will be fully understood upon reference to the accompanying drawings, in which—

Figure 1 is a vertical longitudinal section of a steam boiler furnace to which the present invention is shown applied for purposes of illustration.

Fig. 2 is a plan of those parts of Fig. 1 which have to do particularly with the present invention.

Fig. 3 is a front elevation of the parts shown in Figs. 1 and 2.

Figs. 4 and 5 are sections taken on the line 4—4 and line 5—5 respectively of Fig. 6, showing one of the units of the mechanism through which air and fuel are conveyed through the delivery wall of the furnace.

Fig. 6 is a detail view on an enlarged scale showing the preferred construction of the combustion chamber and its auxiliary air inlet.

Fig. 6ª is a fragmentary view showing a slight modification of the form of auxiliary inlet illustrated in Fig. 6; and Fig. 7 is a view similar to Fig. 6 showing a modified delivery of auxiliary air.

In the drawings, 1 designates a boiler or its contained fluid, which is representative of a thing to be heated in serving some industrial or other useful purpose, 2 designates a furnace in heating relation to the boiler, and 3 represents a complete fuel delivery apparatus, consisting of a hopper 4, communicating with a plurality of transversely disposed barrels 5 spaced suitable distances apart and extending through the side walls of the furnace, as best shown in Fig. 1, in combination with means for introducing a combustion-supporting medium, such as air or the like, in commingling contact with the fuel at the inner furnace wall, whereby the fuel will be directed downwardly substantially parallel to vertical reverberatory walls of the furnace and into the combustion zone. A specific form of barrel for the introduction of the fuel in the furnace which may be used in carrying out the process is shown in Figs. 4 and 5, it being understood that there may be such number of barrels employed in connection with a hopper or the source of supply for the fuel, as may be necessary to meet the particular requirements under which the process is practised. I have shown the fuel barrel 5 provided with a conveyer 6, and with a plurality of alined upstanding fingers 7 intermediate the ends of said barrel, and spaced between the conveyer blades 8 on the shaft 9 in such position as to prevent the fuel adhering to the shaft 9. To further insure a continuous flow of subdivided fuel through the outlet orifice 12, I provide near the extreme inner end of the shaft 9 a plurality of radially disposed fingers 13 alternating with the fixed fingers 14 in the conveyer barrel 5, so as to prevent clogging of the discharge orifice. The end of each conveyer tube 5 is substantially flush with the inner wall of the furnace, the air nozzle 15; however, preferably extending slightly beyond the discharge orifice 12, with its inner end closed horizontally as at 16, but provided with an undercut slot or orifice 17, whereby the air introduced into the duct 15 through the inlet 18 will discharge across the orifice 12 and direct the fuel downwardly in initial streams substantially parallel with the vertical reverbratory walls of the furnace to and upon the bed 26, whence the burning gases are deflected upwardly into the vortex before passing on to the heat-absorbing surfaces to which their heat is to be radiated. The air nozzles may receive their air supply from any suitable source, for example, from a trunk 19 in communication with a discharge end 20 of a motor driven fan 21, and, for regulating the relative quantities of fuel and air delivered, the shaft 23 of the motor which drives the fan may operate a worm gear 24 on the worm shaft 25, so that all of the conveyer shafts 9 will be driven at a speed relative to that of the fan, or in cases in which it is desirable to vary the quantities of fuel and air to correspond with variable work demand, yet maintain relative proportions, two separate actuators may be employed, each automatically controlled by a regulator responsive to the work demand, as for example boiler pressure.

The fuel introducing apparatus, it will be seen, is mounted in the wall 36 of the furnace, while opposite this wall is a wall 27 which may be the bridge wall at the rear of the combustion chamber, which is constructed in its upper portion with an arcuate deflecting surface 28 which directs the vortex back toward the fuel feeding apparatus 3, the arc being preferably so disposed that it will direct heavier particles of fuel, which naturally move to the outer portion of the vortex against the wall 26 above the fuel feed apparatus, 3, and cause them to there impinge against said wall and further assist in their physical reduction, as suggested in Fig. 6.

Located at the bottom of the combustion chamber is an auxiliary air inlet 29, which is subdivided into numerous jets extending along the base of the wall 27 and preferably directed upwardly in close proximity to said wall, as shown in Figs. 1, 6, and 6ª, and with the effect of boosting the vortical action and increasing the proportion of fuel picked up by it, and enabling the vortex to pick up larger particles of fuel than would result from the mere current of air set up by the feeding jets in the apparatus 3. In addition to boosting the vortex, the auxiliary intake 29 leaves ample air throughout the bed of coarser particles of fuel to maintain incandescence in the latter, and so increase the distilling action of the volatile contents thereof.

The auxiliary intake 29 is preferably fed from a flue 30 in the bridge wall 27 and thereby raises the temperature of the air introduced, or it may be fed from a base flue 30ª, as suggested in Fig. 6ª. Again the auxiliary air feed may be through the medium of horizontally presented jets 29ª, as suggested in Fig. 7, and fed from any suitable flue, such for instance, as the flue 30ᵇ in the base of the bridge wall 27.

Coal or other adaptable fuel when used in accordance with the process may be composed partially of dust capable of being ignited in suspension in an oxidizing atmosphere, and partially of larger sized pieces incapable of being ignited in suspension, but small enough to be capable of distribution by a blast upon the bottom of the combustion chamber, or it may be composed exclusively of particles small enough to respond to the influence of the air blasts as herein described without a dust content.

Attention is here directed to the use made in this specification of the word "particles" as intended by applicant to mean pieces of fuel of miscellaneous sizes from dust to the largest sized pieces capable of being distributed by the blast upon the bottom of the combustion chamber.

Air delivery ports 15 are preferably disposed immediately above the fuel delivery openings in such relative position as to result in the air sweeping downwardly transversely across the fuel delivery openings and causing diffusion of the finer particles of the fuel through the air medium, at the same time accomplishing distribution of the larger particles upon the bed of the chamber, said fuel ports 12 and adjacent air delivery ports 18 being located above the bottom of the chamber. The distance above the bottom of the chamber at which such openings are located varies to meet the requirements of various furnace conditions and results; an example of an appropriate distance being that equal to the width of the combustion chamber; that is to say, the dimension of the combustion chamber between the wall in which such openings are located and the opposite wall.

The bottom air admission ports 29 are preferably so disposed as to deliver air in a manner and at a velocity such as to disrupt a portion of a mass of fuel particles if such a mass were placed upon the bottom of the combustion chamber. Means, such as speed controllers 34, 34ª for the motors actuating the fans and the fuel feed screws, are provided for relatively proportioning the quantity of air delivered through the upper admission ports to the quantity delivered through the lower admission ports, fuel and air being always presented to the combustion chamber in measured proportionate quantities, substantially equal to that required for the production and maintenance of a desired result in heat generation and application. The air delivered transversely across the fuel delivery ports 12 is inadequate for complete oxidation of the fuel, but in such quantity that when supplemented by additional air delivered from the lower ports is adequate for complete oxidation of the fuel delivered. The whole quantity of delivered air bears a definite relation to the quantity of fuel supplied to the furnace, and the quantity of air delivered from the upper ports above the fuel delivery bears a relation to the quantity of air delivered from the lower air admission ports, and the division of air between the upper ports and the lower ports bears a relation to the condition of the fuel used; that is to say, that for a fuel containing a large percentage of dust a relatively large percentage of air should be delivered from above the fuel delivery ports, and for a fuel containing a large percentage of particles incapable of ignition in suspension, a relatively large proportion of air should be delivered from the ports adjacent the bottom of the combustion chamber.

To put the process in operation, a flame is produced beneath the coal delivery ports by any convenient means, as, for example, the lighting of a gas jet. The coal delivery means and the air delivery means are then put into operation, air being supplied only from the upper ports. As the fuel is delivered, the air being delivered from above sweeps downwardly across the fuel delivery openings and takes into suspension the finer particles of fuel, which finer particles are immediately ignited by the kindling flame and burn in suspension. The particles which are of a size too large to become heated through to the temperature of ignition in transit to the bottom of the combustion chamber are distributively cast upon the bottom of the combustion chamber. As this process continues the down-cast particles of fuel in the bottom of the combustion chamber are brought to the temperature of ignition by the heat generated by the burning of the finer particles in suspension together with the combustion of the volatile constituents being distilled from the down-cast particles, augmented by the heat of the kindling flame. The walls of the combustion chamber are also heated to a temperature which promotes ignition of the fuel and air by reverberation of heat so generated until at length the temperature of the furnace walls and bed rises to a degree which promotes ignition of the incoming fuel and combustion supporting medium without the influence of the kindling flame, at which stage of the procedure the kindling flame may be extinguished.

As the process continues it is found that a bed composed of a mass of incandescent fuel particles will be established upon the bottom of the combustion chamber.

The degree of rapidity with which this bed will grow is dependent upon the relative quantity of air being delivered together with the fuel, and also upon the degree of fineness to which the fuel has been crushed. As, for example, if the fuel were reduced to a condition of all dust, no bed could be established; and, on the other hand, if the fuel contains no dust, but only large particles, only sufficient air for distribution of such particles would be required from above the fuel delivery, no fuel would be burned in suspension, and in consequence the down-cast particles would accumulate rapidly.

It is desirable in practising the process to maintain a bed consisting of a mass of incandescent fuel particles of a depth commensurate with the results desired, as, for example, in firing a two hundred horse power steam generating furnace such a bed may be maintained to a depth exceeding eight inches upon the bottom of the combustion chamber.

When the bed composed of down-cast incandescent fuel particles has been built to a desired depth, additional air of a quantity sufficient when supplemented by the quantity being delivered from the upper admission ports to constitute a quantity adequate for completely oxidizing the fuel is delivered through the lower ports.

The down-cast particles composing the bed in the bottom of the combustion chamber during the process of building the bed will have had the volatile constituents distilled from them, and, under the influence of reverberatory heat from the walls and bed of the chamber and from the area above the bed in which the suspended particles and volatile constituents are burning, will have become incandescent and devoid of volatile constituents. This condition is augmented by the down-cast particles themselves burning under the oxidizing influence of the downwardly sweeping air.

If the down-cast particles are permitted to accumulate into a bed before distilling from them the volatile constituents they would fuse together and form an integral mass which could be oxidized only from its surface, but inasmuch as the particles are gradually and continuously fed into the furnace and are as continuously distributed by the blast singly upon the incandescent bed of previously down-cast particles to which they cannot fuse or adhere, and inasmuch as the bed itself is continuously impinged upon, swept, penetrated, and its surface disrupted under the influence of the downwardly projected air, fusion of the particles composing the bed does not occur, and the mass of incandescent particles constituting the bed possesses the mobile property to a considerable degree.

The air admission ports located at the bottom of the combustion chamber are so disposed and so arranged as to cause the air or other oxidizing medium issuing therefrom to be projected into the accumulated mass of down-cast particles of fuel in the bottom of the combustion chamber in such a manner and at such a velocity as to penetrate a portion of the bed lying adjacent to such ports, so as to sweep away from this area the constituents of the fuel mass, or bed.

It will be found that as the oxidizing medium being delivered from the lower ports disrupts the side of the bed adjacent such ports and casts the constituents of the disrupted portion of the bed upwardly, other portions of the bed will tend to flow into the voids thus created.

As the particles composing portions of the bed are thrown upwardly by the jets delivered from the lower ports, they pass within the area swept by the incoming air from the upper air ports above the fuel delivery, these latter jets setting up a current which sweeps downwardly along the wall and impinges upon the fuel bed, is then deflected by the fuel bed and sweeps across the same, and is then again deflected by the opposite wall of the furnace and the upward influence of air from the lower jets, so that it sweeps upwardly along the opposite or bridge wall above the portion of the bed disrupted by the lower jets. The form of the bridge wall is such as to cause the atmospheric current rising adjacent to it to be bent inwardly by the upper portion of the bridge wall and to be thrown into the area affected by the jetting influence of the downwardly discharging air from the upper ports. At the same time the particles of fuel swept upwardly from the bed along the bridge wall by said current are impacted upon the upper projection of the bridge wall in a manner to cause them to rebound inwardly and pass within the jetting influence of the downwardly discharging jets where, under such influence combined with that of gravity, they are carried again to the bed. This process becomes continuous.

Oxidation of the constituents of the bed occurs upon the surface of the particles composing it, and inasmuch as the particles being oxidized are not permitted to rest, the accumulation within the combustion chamber of non-combustible constituents of the fuel is prevented, such constituents being liberated from the surface being oxidized and, as fast as liberated, taken into suspension in the furnace atmosphere and carried out of the combustion chamber.

If it is desired to cleanse the furnace atmosphere of non-combustible constituents after it passes from the combustion chamber, and before it discharges through the stack, a compartment may be provided adjacent the combustion chamber of sufficient cross sectional dimensions to permit of the furnace atmosphere, in traversing said compartment, to flow at a velocity sufficiently low that non-combustible particles suspended therein will be deposited under the influence of gravity within said chamber. In generating heat for some purposes, as, for example, the generation of steam, such a compartment may be provided in a position from which the heat residual in the non-combustible constituents of the fuel deposited in the bottom of the compartment will be radiated to heating surfaces, thereby appropriating heat residual in the ash in a manner to increase efficiency in heat application and fuel conservation.

I claim:

1. The process of oxidizing solid fuel, which consists in forcibly passing adaptably subdivided fuel together with an oxidizing medium downwardly into a side of a zone maintained at a temperature which promotes ignition, burning finer particles of said fuel in suspension, casting larger particles to form an incoherent bed, and agitating particles which compose the portions of said bed opposite the side at which downward projection occurs, by a projected stream of additional oxidizing medium.

2. The process of oxidizing solid fuel, which consists in forcibly passing adaptably subdivided fuel together with an oxidizing medium downwardly into a side of a zone maintained at a temperature which promotes ignition, burning finer particles of said fuel in suspension, casting larger particles to form an incoherent bed, continuously impinging upon a side only of said bed by the downwardly issuing oxidizing medium, and agitating particles composing portions of the bed at the side opposite that at which the fuel is delivered.

3. The process of oxidizing fuel, which consists in forcibly passing fuel subdivided into finer and coarser particles together with an oxidizing medium downwardly into a side of a zone maintained at a temperature which promotes ignition, burning finer particles of said fuel in suspension, casting larger particles to form an incoherent bed, continuously impinging upon a side of said bed by the downwardly issuing oxidizing medium and coarse particles, and agitating particles composing portions of the bed by projecting an additional stream of oxidizing medium into the side of the bed opposite that at which the fuel is delivered in a manner to cast particles composing such side of the bed upwardly into suspension.

4. The process of oxidizing solid fuel, which consists in distributively casting adaptably sized pieces of fuel into a combustion chamber maintained at a temperature which promotes ignition and downwardly upon the bottom thereof, thereby building a bed composed of incoherent fuel particles, projecting an oxidizing medium downwardly from above a side of said bed in a manner to favor establishment and maintenance of vortical circulation in the zone above the bed, disrupting portions of the bed by projecting additional oxidizing medium from beneath the bed at the side opposite the downwardly issuing stream of oxidizing medium, and feeding constituents of such disrupted portions into a side of the vortex.

5. The process of oxidizing solid fuel, which consists in distributively casting adaptably sized pieces of fuel into and upon the bottom of a combustion chamber maintained at a temperature which promotes ignition, thereby building a bed composed of incoherent fuel particles, projecting an oxidizing medium downwardly from above a side of said bed in a manner to favor establishment and maintenance of vortical circulation in the zone above the bed, disrupting portions of the bed by projecting a stream of additional oxidizing medium from beneath the portions of the bed at a side of the combustion chamber opposite the downwardly issuing stream of oxidizing medium, and feeding constituents of such disrupted portions into a side of the vortex in coincidence with the direction of the vortical circulation at such side.

6. The process of oxidizing solid fuel, which consists in distributively casting adaptably sized pieces of fuel into and upon the bottom of a combustion chamber maintained at a temperature which promotes ignition, thereby building a bed composed of incoherent fuel particles, projecting an oxidizing medium downwardly from above a side of said bed in a manner to favor establishment and maintenance of vortical circulation in the zone above the bed, and disrupting portions of the bed at a side of the combustion chamber opposite that in which downward projection occurs by projecting a stream of additional oxidizing medium from beneath, into a side of the vortex in a manner to accelerate the vortical flow, and at a velocity capable of dislodging constituents of the bed and casting them upwardly into the vortex.

7. The process of oxidizing solid fuel, which consists in distributively casting adaptably sized pieces of fuel into a combustion chamber maintained at a temperature which promotes ignition in such a manner as to establish and maintain within said chamber an incoherent flowing bed composed of incandescent fuel particles, maintaining disruption of portions of the bed by projecting oxidizing medium into and through the area into which portions of the bed tend to flow in such a manner as to favor establishment and maintenance of vortical circulation in the zone above the bed, and to feed constituents of the disrupted portions of the bed into the vortical circulation and causing other portions of the bed to flow into the area of disruption.

8. The process of oxidizing solid fuel, which consists in flowing an incoherent bed composed of incandescent fuel particles to an area of disruption, disrupting the bed, and feeding constituents of the disrupted portions into a vortical circulation of oxidizing medium established and maintained by streams of oxidizing medium being projected downwardly adjacent one confine of a combustion chamber and upwardly adjacent the opposite confine of the chamber and supplying fuel to the fuel bed to maintain the same, the chamber being maintained at a temperature which promotes ignition.

9. The process of oxidizing solid fuel, which consists in projecting adaptably subdivided fuel commingled with an oxidizing vehicle downwardly in heat absorbing relation to a reverberatory wall of a combustion chamber closed at its bottom and sides with the exception of fuel delivery and air admission ports, burning finer particles of the fuel in suspension, casting larger particles of fuel to develop an incandescent mobile bed of fuel particles, maintaining disruption of portions of said bed, commingling constituents of such disrupted portions with oxidizing medium, and continuously causing other portions of the bed to flow into the area of disruption.

10. The process of oxidizing solid fuel, which consists in projecting adaptaby subdivided fuel commingled with an oxidizing vehicle downwardly in heat absorbing relation to a reverberatory wall of a combustion chamber closed at its bottom and sides with the exception of fuel delivery and air admission ports, burning finer particles of the fuel in suspension, casting larger particles in such a manner as to form a fuel bed composed of incandescent fuel particles, maintaining disruption of portions of the bed, commingling constituents of such disrupted portions with the oxidizing medium, continuously causing other portions of the bed to flow into the area of disruption, and continuously casting constituents of the bed from the area of disruption upwardly into suspension.

11. The process of oxidizing solid fuel, which consists in projecting adaptably subdivided fuel commingled with a primary stream of oxidizing vehicle downwardly in heat absorbing relation to a reverberatory wall of a combustion chamber closed at its bottom and sides with the exception of fuel delivery and air admission ports, burning finer particles of the fuel in suspension, casting larger particles to form a mobile bed of incandescent fuel particles, directing an auxiliary stream of oxidizing medium against and maintaining disruption of portions of the bed and thereby continuously casting upwardly into suspension the constituents of such disrupted portions and commingling the same with said oxidizing medium, and continually flowing by the primary stream of oxidizing medium other portions of the bed into the area of disruption.

12. The process of oxidizing solid fuel, which consists in moving an incoherent bed composed of incandescent fuel particles to an area of disruption, disrupting the bed, and feeding constituents of the disrupted portions into a vortical circulation of oxidizing medium established and maintained by streams of oxidizing medium being projected downwardly adjacent one confine of a combustion chamber and upwardly adjacent the opposite confine of the chamber and supplying fuel to the bed to maintain the same, the chamber being maintained at a temperature which promotes ignition; the confines of the chamber being constructed to favor continuity of vortical circulation in the zone above the bed.

13. The process of oxidizing solid fuel, which consists in blasting adaptably conditioned fuel together with an oxidizing medium into a combustion chamber maintained at a temperature which promotes ignition in such a manner as to form and maintain a mobile bed composed of incandescent fuel particles of such proportions and of such mobility as to result in portions of the bed flowing by gravity, and projecting a stream of oxidizing medium through the area into which the bed tends to flow in a manner to sweep the flowing constituents of the bed upwardly adjacent a confine of the chamber adaptably constructed to deflect such constituents in a manner to cause them to be returned to the bed.

14. The process of oxidizing solid fuel, which consists in delivering adaptably conditioned fuel into a combustion chamber maintained at a temperature which promotes ignition in such a manner as to form an incoherent mobile bed composed of incandescent fuel particles, the bed being formed and maintained in such proportions and of such degree of mobility as to cause portions thereof to flow by gravity, and projecting oxidizing medium through the area into which the bed tends to flow in a manner and at a velocity to sweep the flowing constituents of the bed upwardly adjacent a confine of the combustion chamber adaptably constructed to deflect such constituents in a manner to cause them to be returned upon the bed.

15. The process of oxidizing solid fuel, which consists in delivering adaptably conditioned fuel together with an oxidizing medium downwardly into a side of a combustion chamber maintained at a temperature which promotes ignition, burning finer particles of the fuel in suspension, casting larger particles in such a manner as to form an incoherent mobile bed composed of incandescent fuel particles, the bed being formed in such proportions and of such degree of mobility as to cause portions thereof to flow by gravity, and projecting an oxidizing medium through the area into which the bed tends to flow in a manner and at a velocity to sweep constituents of the bed entering such area upwardly adjacent a confine of the chamber adaptably constructed to deflect such constituents in a manner to cause them to reënter the area of the downwardly projecting streams, whereby continuity of vortical circulation is maintained in the zone above the bed and constituents of the bed continuously showered into the vortex.

Signed at New Castle, Penna., this 20 day of November, 1918.

THOS. J. STEPHENS.